(12) United States Patent
Paletta et al.

(10) Patent No.: US 11,890,685 B2
(45) Date of Patent: Feb. 6, 2024

(54) CUTTING TOOL, A METHOD FOR MANUFACTURING A CUTTING TOOL AND A METHOD FOR MACHINING OF A WORKPIECE

(71) Applicant: SECO TOOLS AB, Fagersta (SE)

(72) Inventors: Massimo Paletta, Cernobbio (IT); Hans Hermans, Grubbenvorst (NL)

(73) Assignee: Seco Tools AB, Fagersta (SE)

( * ) Notice: Subject to any disclaimer, the term of this patent is extended or adjusted under 35 U.S.C. 154(b) by 345 days.

(21) Appl. No.: 17/437,009

(22) PCT Filed: Mar. 3, 2020

(86) PCT No.: PCT/EP2020/055505
§ 371 (c)(1),
(2) Date: Sep. 7, 2021

(87) PCT Pub. No.: WO2020/182534
PCT Pub. Date: Sep. 17, 2020

(65) Prior Publication Data
US 2022/0176471 A1   Jun. 9, 2022

(30) Foreign Application Priority Data

Mar. 13, 2019   (EP) ..................... 19162539

(51) Int. Cl.
*B23C 5/10*   (2006.01)
(52) U.S. Cl.
CPC ........ *B23C 5/10* (2013.01); *B23C 2210/0485* (2013.01); *B23C 2210/088* (2013.01); *B23C 2210/326* (2013.01)

(58) Field of Classification Search
CPC .. B23C 5/10; B23C 5/16; B23C 5/165; B23C 2210/0492; B23C 2210/40; B23C 2210/48; B23C 2210/486; B23C 2226/27
See application file for complete search history.

(56) References Cited

U.S. PATENT DOCUMENTS 1,358,432 A * 11/1920 Fink .................... A61C 3/02
433/165
2,652,075 A   9/1953 Mannes
(Continued)

FOREIGN PATENT DOCUMENTS

CN   201161304 Y   12/2008
CN   108927562 A   12/2018
(Continued)

*Primary Examiner* — Nicole N Ramos
(74) *Attorney, Agent, or Firm* — Corinne R. Gorski (57) ABSTRACT

A rotatable cutting tool for machining of a honeycomb core includes a front end; a rear end; a peripheral surface extending between the front and rear ends; a set of helical flutes formed in the peripheral surface at a first helix angle $45° \leq \alpha \leq 65°$, having a first depth; and a set of helical ridges. At least one helical groove formed in the peripheral surface at a second helix angle $90° < \beta \leq 100°$, has a second depth, which is smaller than the first depth. The at least one helical groove intersects the helical ridges so that a plurality of cutting teeth are formed on each helical ridge. Each cutting tooth includes a second ridge formed in a transition between two lands, a cutting edge and a clearance edge join in a tooth tip constituting the radially outermost point of the cutting tooth.

15 Claims, 5 Drawing Sheets

(56) References Cited

U.S. PATENT DOCUMENTS

| | | | | | |
|---|---|---|---|---|---|
| 2,855,657 | A | * | 10/1958 | Erhardt | B23C 5/04 |
| | | | | | 407/115 |
| 3,058,199 | A | * | 10/1962 | Cave | B23C 5/10 |
| | | | | | 83/846 |
| 3,736,634 | A | * | 6/1973 | Sonnie | B23C 5/10 |
| | | | | | 407/54 |
| 4,285,618 | A | * | 8/1981 | Shanley, Jr. | B23C 5/10 |
| | | | | | 407/57 |
| 4,721,421 | A | * | 1/1988 | Klinger | B23C 5/10 |
| | | | | | 407/54 |
| 5,193,944 | A | * | 3/1993 | Nishimura | B23C 5/1081 |
| | | | | | 407/53 |
| 7,232,311 | B1 | * | 6/2007 | Greggs | A61C 3/02 |
| | | | | | 433/165 |
| 7,544,021 | B2 | * | 6/2009 | Flynn | B23C 5/003 |
| | | | | | 407/54 |
| 8,402,867 | B2 | * | 3/2013 | Harif | B23C 5/1045 |
| | | | | | 29/90.01 |
| 11,014,173 | B2 | * | 5/2021 | Huijs | B23C 5/10 |
| 2013/0136548 | A1 | * | 5/2013 | Takahashi | B23C 5/165 |
| | | | | | 407/54 |
| 2015/0147127 | A1 | * | 5/2015 | Shpigelman | B23C 5/10 |
| | | | | | 407/54 |
| 2022/0072628 | A1 | * | 3/2022 | Bonfiglio | B23B 47/34 |

FOREIGN PATENT DOCUMENTS

| | | | | | |
|---|---|---|---|---|---|
| DE | 102009015262 | A1 | | 10/2009 | |
| EP | 0329624 | A2 | | 8/1989 | |
| JP | 2008114308 | A | | 5/2008 | |
| JP | 2011020248 | A | * | 2/2011 | B23C 5/10 |
| KR | 20020077582 | A | | 10/2002 | |

* cited by examiner

CUTTING TOOL, A METHOD FOR MANUFACTURING A CUTTING TOOL AND A METHOD FOR MACHINING OF A WORKPIECE

RELATED APPLICATION DATA

This application is a § 371 National Stage Application of PCT International Application No. PCT/EP2020/055505 filed Mar. 3, 2020 claiming priority to EP 119162539.1 filed Mar. 13, 2019.

TECHNICAL FIELD

The present invention relates to a rotatable cutting tool for machining of a workpiece comprising a honeycomb core according to the preamble of claim 1. In particular, but not exclusively, the cutting tool is suitable for machining of a workpiece consisting of a honeycomb core. The invention further relates to a method for manufacturing such a cutting tool and to a method for machining of a workpiece comprising a honeycomb core.

BACKGROUND OF THE INVENTION

Honeycomb structures are commonly used in aerospace applications due to their ability to provide high strength at a relatively low weight. Typically, honeycomb structures comprise a honeycomb core material layered between thin sheets of e.g. fiber reinforced plastic material to form a sandwich structure. For machining of such structures, it is common to use rotatable cutting tools having a plurality of peripheral cutting edges formed on helical ridges extending around a longitudinal axis of the cutting tool.

DE102009015262 discloses a cutting tool that may be used for machining of such layered honeycomb structures. In a peripheral surface of the cutting tool, a set of relatively deep helical flutes for chip evacuation extend, and relatively shallow grooves extend at an angle with respect to the helical flutes. In a transition between two adjacent deep helical flutes, linear cutting edges are formed, extending along the helical flutes. The cutting edges are interrupted by lands formed by the shallow grooves. The tool configuration results in relatively strong cutting edges suitable for machining of layered structures including fiber reinforced plastic layers, but also in large cutting forces and heat development during machining, thus decreasing the tool life and increasing machining costs.

For machining of workpieces comprising honeycomb cores, but not necessarily included in a sandwich structure, it would be desirable to provide a cutting tool by means of which an increased tool life and an improved machining economy can be achieved.

SUMMARY OF THE INVENTION

It is a primary object of the present invention to overcome or alleviate at least one of the disadvantages of the prior art, or to provide a useful alternative. In particular, it is an object to provide a cutting tool suitable for machining of a workpiece comprising a honeycomb core, or a workpiece consisting of a honeycomb core, i.e. that is not comprised in a sandwich structure. Furthermore, it is an object to provide such a cutting tool with improved tool life giving an improved machining economy in comparison with prior art cutting tools.

According to a first aspect of the invention, at least the primary object is achieved by means of the initially defined cutting tool, which exhibits the features defined in the characterizing part of claim 1.

The cutting tool has a longitudinal axis around which the cutting tool is rotatable in a direction of rotation and comprises:
- a front end;
- a rear end opposite to the front end, the cutting tool being adapted to be fastened to a tool holder or a machine spindle;
- a peripheral surface extending around the longitudinal axis between the front end and the rear end;
- a set of helical flutes for chip evacuation formed in the peripheral surface, the helical flutes extending from the front end towards the rear end at a first helix angle $\alpha$ with respect to the longitudinal axis, wherein $45° \leq \alpha \leq 65°$, the helical flutes having a first depth;
- a set of helical ridges, each helical ridge being associated with and formed between a pair of adjacent helical flutes comprising a first associated helical flute and a second associated helical flute, wherein the second associated helical flute is positioned behind the first associated helical flute in the direction of rotation,
- at least one helical groove formed in the peripheral surface, the at least one helical groove having a second depth which is smaller than the first depth, so that the at least one helical groove is interrupted by the helical flutes, wherein the at least one helical groove intersects the helical ridges so that a plurality of lands are formed on each helical ridge, each land extending between the first associated helical flute and the second associated helical flute, and so that a plurality of cutting teeth are formed on each helical ridge, each cutting tooth being delimited at least by a pair of associated adjacent lands of said plurality of lands, said pair of associated adjacent lands comprising a first associated land and a second associated land, wherein the second associated land is positioned at a larger axial distance from the front end than the first associated land.

The tool is characterized in that the at least one helical groove extends at a second helix angle $\beta$ with respect to the longitudinal axis, wherein $90° < \beta \leq 100°$, and that each cutting tooth of said plurality of cutting teeth comprises:
- a second ridge, the second ridge being formed in a transition between the first associated land and the second associated land,
- a cutting edge formed in a transition between the first associated land and the first associated helical flute, and
- a clearance edge formed in a transition between the second associated land and the first associated helical flute, wherein the second ridge, the cutting edge and the clearance edge join in a tooth tip constituting the radially outermost point of the cutting tooth and being located at a cutting radius of the cutting tool.

The cutting tool has a cutting portion extending from the front end towards the rear end, the cutting portion including the cutting teeth. The cutting tool may also have a mounting portion extending from the rear end towards the front end. The cutting tool may be adapted to be fastened to a tool holder directly or via an intermediate part, but it may also be integrally formed with a holder. The cutting tool may typically be adapted to be fastened to the tool holder or the machine spindle with the rear end facing the tool holder or the machine spindle.

The longitudinal axis is a center axis of the cutting tool.

The angle α may be constant for at least one of the helical flutes or for all helical flutes within the set of helical flutes, along a part or along the entire cutting portion.

In particular, but not exclusively, the helical flutes may be identical or substantially identical to each other and/or equally spaced from each other. At least two helical flutes may be parallel to each other.

In particular, but not exclusively, the first depth of one helical flute may be constant along its extension. In particular, but not exclusively, all helical flutes within the set of helical flutes may have a constant first depth along their extension.

The lands comprised in the plurality of lands may be identical or substantially identical to each other. Alternatively, the lands comprised in the plurality of lands along one helical ridge man be identical or substantially identical to each other.

The second helix angle β, when in the range $90°<β≤100°$, and the first helix angle α, when in the range $45°≤α≤65°$, together result in relatively low cutting forces. The angle β must be larger than 90° to create a helical groove. Furthermore, if the angle β would be equal to 90° the grooves would not have any pitch which would result in an unfavorable axial distribution of the cutting teeth and the tooth tips. Also, if β is larger than 100°, the benefits related to the cutting tool are diminished. Thanks to relatively low cutting forces, a relatively small amount of heat is generated which in its turn increases the tool life and thereby also the machining economy.

Since the cutting edges are formed in the transitions between the lands formed by the relatively shallow helical groove and the helical flutes, and since the second ridge is formed in the transition, i.e. intersection, between two lands formed adjacent to each other along one helical ridge, there are no linear cutting edges formed in an intersection, i.e. a transition, between two adjacent helical flutes. Instead, adjacent helical flutes are separated from each other by the lands, i.e. a chain of lands, formed on the helical ridge, wherein adjacent lands are only separated by the second ridges formed in the transitions, i.e. intersections, therebetween. Thereby, the cutting forces arising during machining may be reduced in comparison with cutting tools comprising linear cutting edges extending along the helical flutes. The cutting action is thus performed by cutting edges formed in the transitions between the lands and the helical flutes instead of by linear cutting edges formed in the intersection between two adjacent helical flutes. The cutting edges formed in the transitions between the lands and the helical flutes have been found to have a more suitable direction of extension than such linear cutting edges.

The configuration of the proposed cutting tool results in relatively sharp cutting edges, particularly suitable for machining of honeycomb cores.

It is not necessary that the at least one helical groove has the same axial extension as the helical flutes. The helical groove(s) may have a shorter axial extension, whereby one or more portion(s) of the cutting tool may be provided with a different cutting geometry. This may be suitable e.g. for the machining of layered structures comprising honeycomb core material sandwiched between thin layers, in which case the different cutting geometry may be a cutting geometry offering stronger cutting edges more suitable for machining of fiber reinforced polymers. For example, a portion with different cutting geometry may be provided in connection with the front end of the cutting tool and/or closer to the rear end of the cutting tool.

The cutting tool may comprise four, or five, or six, or more helical flutes for chip evacuation. The cutting tool may according to one embodiment comprise eight helical flutes.

The cutting tool may further comprise at least two front cutting edges formed at the front end of the cutting tool. The number of front cutting edges may preferably be smaller than the number of helical flutes for chip evacuation.

The first helix angle α should be between 45° and 65°. The lower limit of 45° is selected to ensure a favorable direction of cutting forces and thereby a satisfying cutting action. If the first helix angle α is smaller than 45°, a less favorable direction of cutting forces is obtained. The upper limit of 65° is selected since flutes with larger helix angles are difficult to produce.

According to one embodiment, the cutting edge of each cutting tooth of the plurality of teeth, when seen in a plane perpendicular to the longitudinal axis, extends radially inwards from the tooth tip at an angle γ with respect to a radial line extending between the longitudinal axis and the tooth tip. Such an extension of the cutting edge is observed to be more favorable in machining of honeycomb cores than an extension of a cutting edge formed in an intersection between two helical flutes, in which the cutting edge extends around the periphery of the tool and does not extend radially inwards.

According to a further one embodiment, the angle γ is such that $-20°≤γ≤+30°$, more preferably $-5°≤γ≤+20°$ and most preferably $γ=0°$, when seen in a plane perpendicular to the longitudinal axis. It has been observed that the values $-20°≤γ≤+30°$ are most suitable. If the angle γ is less than −20°, less favorable cutting action is achieved, and more heat is generated. If the angle γ is larger than +30°, the cutting tooth is too weak. A more improved performance is observed when $-5°≤γ≤+20°$. From a manufacturing perspective, $γ=0°$ is preferable. The angle γ is defined to be positive if, adjacently to the tooth tip, it extends behind the radial line extending between the longitudinal axis and the tooth tip in the direction of rotation, i.e. if a tangent to the cutting edge extends behind the radial line as seen in the direction of rotation of the cutting tool.

According to one embodiment, each second ridge has a first end that coincides with the tooth tip and a second end situated behind the first end in the direction of rotation. The second ridge may preferably form a straight line and/or it may have an extension parallel with a direction of extension of the at least one helical groove.

According to one embodiment, a radial distance between the second end of each second ridge and the longitudinal axis is smaller than or equal to a radial distance between the first end of each second ridge and the longitudinal axis. Preferably, all points on the second ridge located behind the first end in the direction of rotation are located on a smaller radial distance from the longitudinal axis than the first end, such that a clearance is provided between the second ridge and the workpiece surface during machining. This is beneficial from a manufacturing point of view and has a positive influence on the cutting forces, which means that the cutting forces are decreased.

According to one embodiment, a largest land width of each of said plurality of lands, as measured along a direction of extension of the at least one helical groove, is less than 30%, preferably less than 20%, more preferably less than 15% and most preferably less than 10% of a shortest distance between two of said lands situated on two neighboring helical ridges, as measured along a direction of extension of the at least one helical groove.

According to one embodiment, each land of said plurality of lands, as measured along a direction of extension of the at least one helical groove, has a land width that varies along a direction of extension of the helical ridge on which the land is located.

According to one embodiment, between each pair of adjacent second ridges located on the same helical ridge, said pair of adjacent second ridges comprising a first associated second ridge and a second associated second ridge, the first associated second ridge being positioned closer to the front end than the second associated second ridge, the land width increases from the first associated second ridge towards the second associated second ridge. Thus, the land width increases in a direction away from the second ridge, i.e. when moving along the clearance edge away from the front end of the cutting tool. Thanks to this, the clearance edge obtains its clearance function, while at the same time the at least one helical groove and the lands are easily created.

According to one embodiment, the first depth is such that a shortest radial distance between a surface of each of said helical flutes and the longitudinal axis is 55-70% of the cutting radius, or 60-65% of the cutting radius. Within the mentioned interval of 55-70% the tool has best productivity. If the shortest distance between the surface of each of said helical flutes and the longitudinal axis is less than 55% of the cutting radius, the cutting tool has a good chip evacuation ability because the helical flutes are deep, but the tool may be too weak to withstand high feed rates, and the feed rate must consequently be reduced. If the shortest radial distance between the surface of each of said helical flutes and the longitudinal axis is instead more than 70% of the cutting radius, the tool has a good strength, but the chip evacuation ability is reduced, and the feed rate must be reduced to avoid excessive heat generation due to difficulties associated with chip evacuation, which in its turn decreases the tool life. Best performance and tool life is achieved when the shortest radial distance between the surface of each of said helical flutes and the longitudinal axis is 60-65% of the cutting radius.

The sum of the first depth (i.e. the depth of the helical flutes) and said shortest radial distance between the surface of each of said helical flutes and the longitudinal axis equals the cutting radius.

According to one embodiment, the second depth is such that a shortest radial distance between a surface of each land of said plurality of lands and the longitudinal axis is 85-99.9% of the cutting radius, more preferably 92-99% of the cutting radius, and most preferably 95-97% of the cutting radius. Within the mentioned interval of 85-99.9%, the tool may achieve its best productivity. If the radial distance between the surface of each land of said plurality of lands and the longitudinal axis is at least 85% of the cutting radius, the cutting teeth are strong enough and can withstand high feed rates. If the radial distance between the surface of each land of said plurality of lands and the longitudinal axis is not more than 99.9%, the clearance edge has a sufficient clearance angle and thus heat generation is limited. Furthermore, the cutting edge may be given an adequate length to achieve a desired productivity.

The sum of the second depth (i.e. the depth of the helical groove) and said shortest radial distance between the surface of each land and the longitudinal axis equals the cutting radius.

According to one embodiment, each land of said plurality of lands is in the form of a curved surface. Thanks to this, the cutting edge can be given a desired angle $\gamma$ and the clearance edge can also be given a desired clearance angle.

According to one embodiment, as measured in the axial direction of the cutting tool, a smallest axial distance y between two tooth tips of the cutting tool (1) is $0<y\leq0.3$ mm, preferably $0.05\leq y\leq0.2$ mm. It is by the lower limit ensured that the cutting teeth are located at different axial positions, and the upper limit ensures that the cutting performance is not deteriorated. Within the interval $0.05\leq y\leq0.2$ mm, a good axial distribution of the cutting teeth is provided, resulting in improved tool life.

According to one embodiment, said smallest axial distance y is measured between a first tooth tip located on a first one of said helical ridges and a second tooth tip located on a second one of said helical ridges located directly behind the first helical ridge in the direction of rotation, wherein the second tooth tip is located closer to the front end than the first tooth tip. Thanks to this, the material is removed stepwise, which further decreases heat generation and improves the tool life.

According to another aspect of the invention, a method for manufacturing the proposed cutting tool is provided, the method comprising:
providing a cylindrical tool blank with a circular base,
forming the set of helical chip evacuation flutes using a first grinding wheel having a first grinding surface and a second grinding surface, the second grinding surface preferably being formed at an angle $\theta_1$ of 35-55° with respect to the first grinding surface,
forming the at least one helical groove using a second grinding wheel having a first grinding surface and a second grinding surface, the second grinding surface preferably being formed at an angle $\theta_2$ of 10-20° with respect to the first grinding surface.

According to yet another aspect of the invention, a method for machining of a workpiece comprising a honeycomb core is provided, the method comprising:
providing the proposed cutting tool,
simultaneously rotating the cutting tool in the direction of rotation and moving the cutting tool with respect to the workpiece in a feeding direction, or moving the workpiece with respect to the cutting tool, such that at least some of the cutting edges of the cutting teeth are brought into engagement with the honeycomb core.

Other advantages and advantageous embodiments of the invention will appear from the following detailed description.

BRIEF DESCRIPTION OF THE DRAWINGS

Embodiments of the present invention will hereinafter be further explained by means of non-limiting examples with reference to the appended drawings, wherein.

It should be noted that the appended drawings are schematic and that individual components are not necessarily drawn to scale and that the dimensions of some features of the present invention may have been exaggerated for the sake of clarity.

DETAILED DESCRIPTION OF PREFERRED EMBODIMENTS

Figure 1:
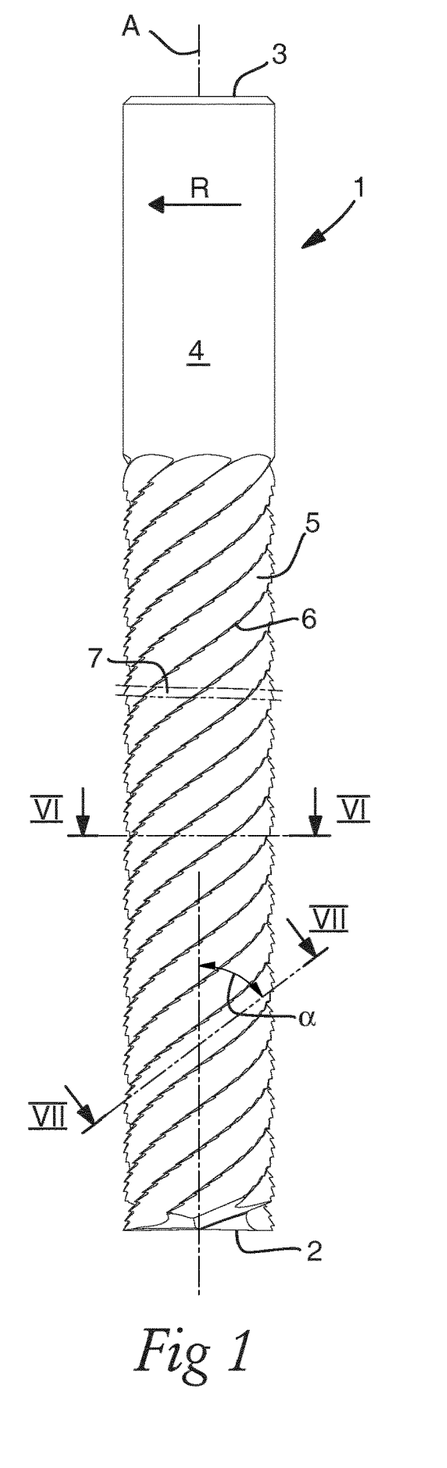
FIG. 1 is a side view of a cutting tool according to an embodiment of the invention.
Figure 2:
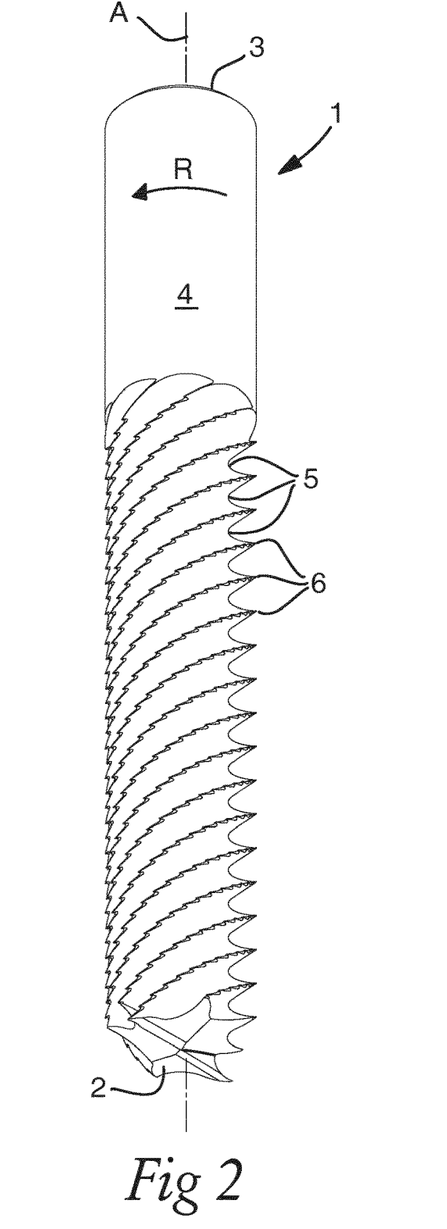
FIG. 2 is a perspective view of the cutting tool in FIG. 1.
Figure 3:
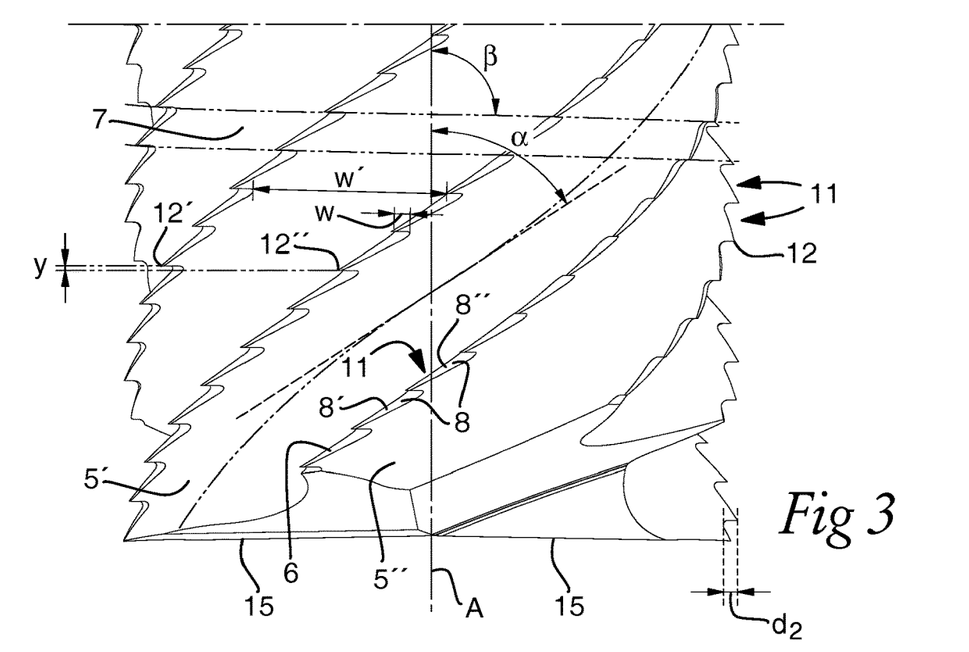
FIG. 3 is a side view of a portion of the cutting tool in FIG. 1.
Figure 4:
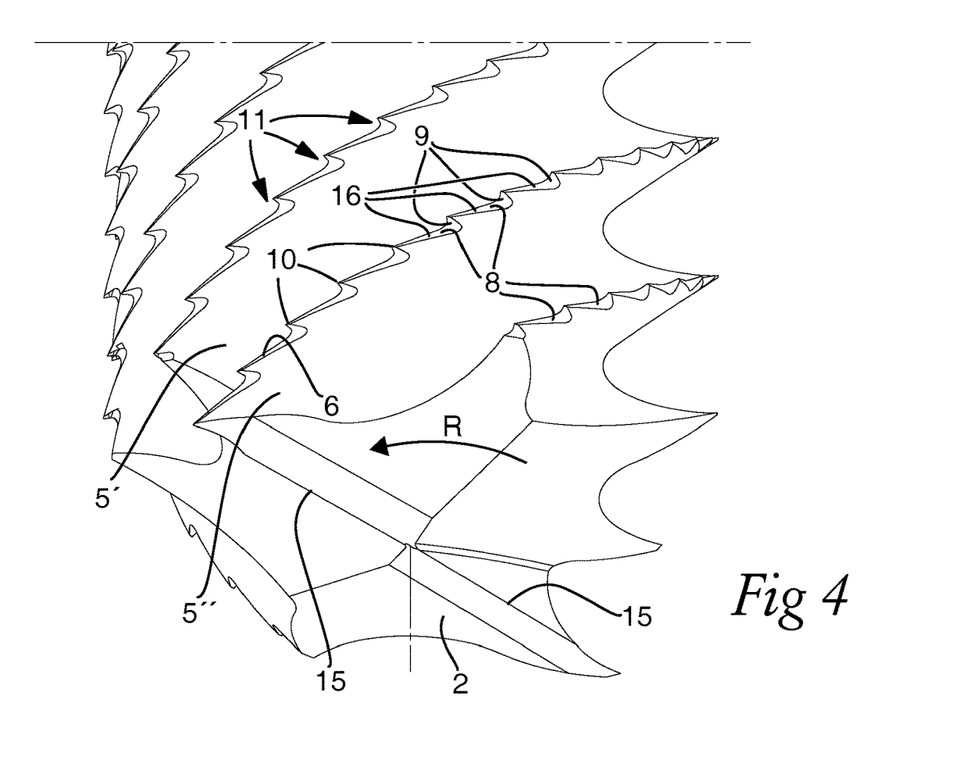
FIG. 4 is a perspective view of a portion of the cutting tool in FIG. 1.

FIGS. 1-2 show a rotatable cutting tool 1 for machining of a workpiece comprising or consisting of a honeycomb core according to an embodiment of the invention. The cutting tool 1 has a longitudinal axis A around which the cutting tool 1 is rotatable in a direction of rotation R, the longitudinal axis A extending between a front end 2 and an opposite rear end 3 of the cutting tool 1. Extending from the rear end 3, a mounting portion is provided, which mounting portion is adapted to be fastened to a tool holder (not shown). When mounted, the rear end 3 of the cutting tool 1 thus faces the tool holder. Reference is also made to FIGS. 3-4, showing a portion of the cutting tool 1 including the front end 2 in more detail, and to FIGS. 6-7, showing sectional views of the cutting tool 1.

A peripheral surface 4 of the cutting tool 1 extends around the longitudinal axis A between the front end 2 and the rear end 3. In the peripheral surface 4, a set of helical flutes 5 for chip evacuation, in the shown embodiment eight helical flutes 5, are formed. The helical flutes 5 extend from the front end 2 towards the rear end 3 at a first helix angle $\alpha$ with respect to the longitudinal axis A, wherein $45° \leq \alpha \leq 65°$.

Figure 6:
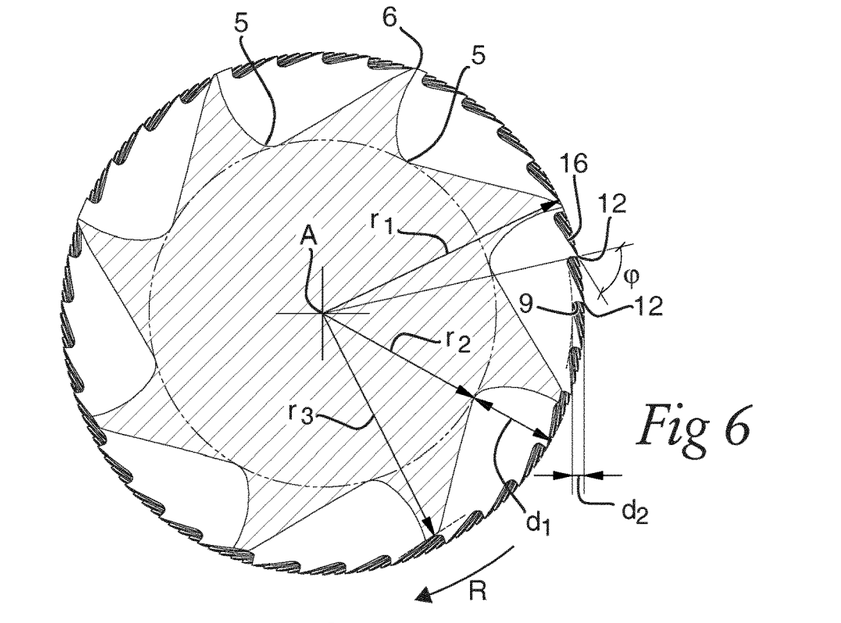
FIG. 6 is a section along the line VI-VI in FIG. 1.
Figure 7:
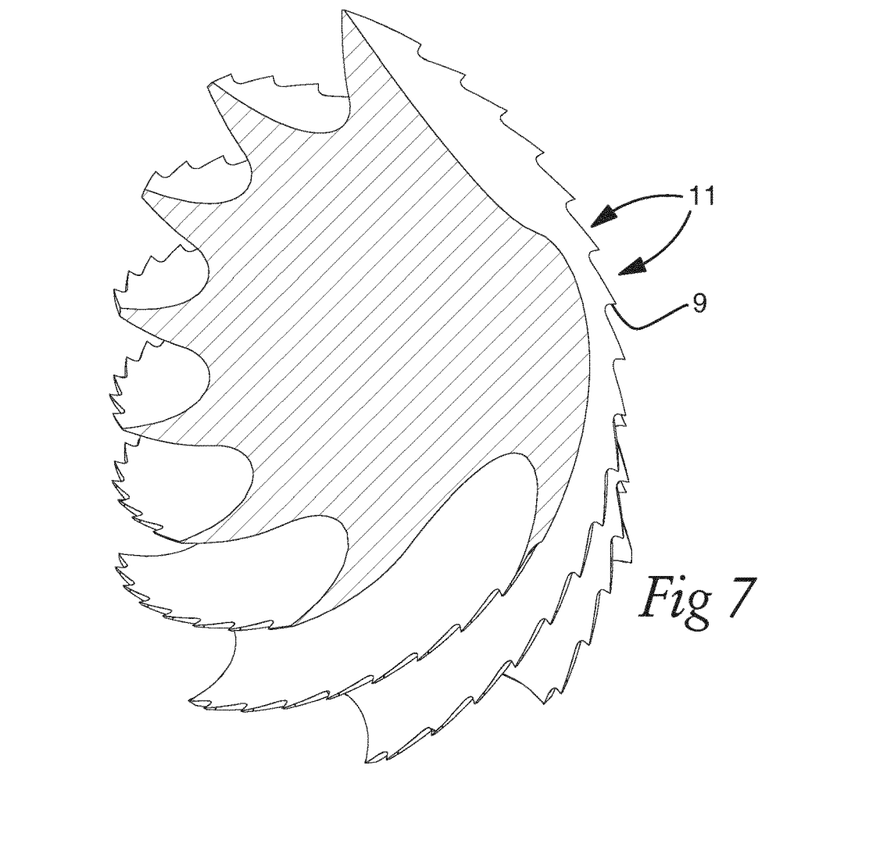
FIG. 7 is a section along the line VII-VII in FIG. 1.
Figure 8:
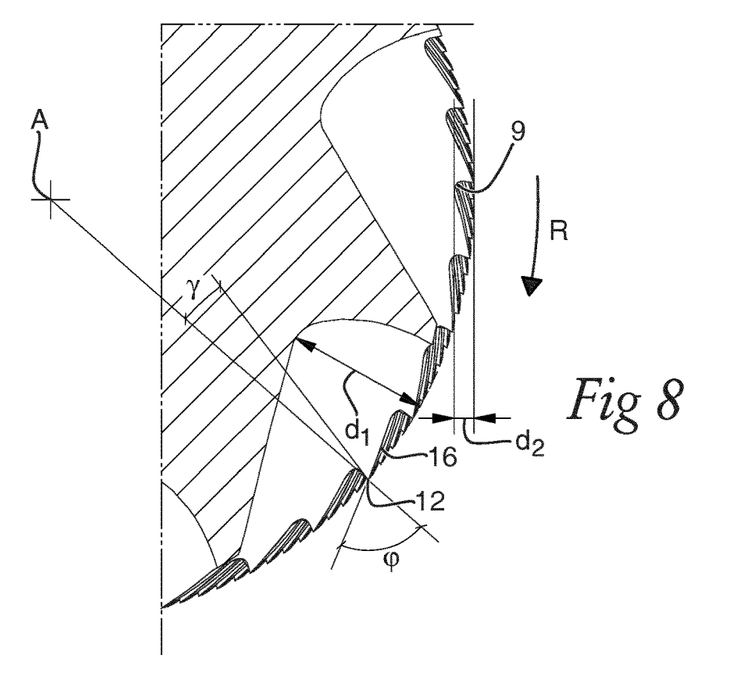
FIG. 8 is a detail view showing a portion of the section in FIG. 6.

As shown in FIGS. 6 and 8, the helical flutes 5 have a first depth $d_1$ as measured radially towards the longitudinal axis A from a point on an imaginary cylinder centered on the longitudinal axis A and having a radius corresponding to a cutting radius $r_1$ of the cutting tool 1. The first depth $d_1$ is such that a radial distance $r_2$ between a bottom of each of the helical flutes and the longitudinal axis A is 55-70% of the cutting radius $r_1$ of the cutting tool 1, preferably 60-65% of the cutting radius $r_1$. Thus, $d_1 + r_2 = r_1$.

Between each pair of adjacent helical flutes 5', 5", a helical ridge 6 is formed. Thus, a set of eight helical ridges 6 are formed in the shown embodiment. Each helical ridge 6 is associated with the pair of adjacent helical flutes 5', 5" comprising a first associated helical flute 5' and a second associated helical flute 5", wherein the second associated helical flute 5" is positioned behind the first associated helical flute 5' in the direction of rotation R.

A helical groove 7 is formed in the peripheral envelope surface at a second helix angle $\beta$ with respect to the longitudinal axis A, wherein $90° < \beta \leq 100°$, as shown in FIG. 3. For clarity, the extension of the helical groove 7 is marked by dashed lines.

In the shown embodiment, $\beta = 91°$. As shown in FIGS. 3, 6 and 8, the helical groove 7 has a second depth $d_2$ as measured radially towards the longitudinal axis A from a point on the above defined imaginary cylinder. The second depth $d_2$ is smaller than the first depth $d_1$, so that the helical groove 7 is interrupted by the helical flutes 5. For clarity, the extension of the helical groove 7 is marked by dashed lines in FIG. 3.

The second depth $d_2$ is such that a radial distance $r_3$ between a radially innermost point of each land 8 and the longitudinal axis A is 85-99.9% of a cutting radius $r_1$ of the cutting tool 1, preferably 92-99% of the cutting radius $r_1$, more preferably 95-97% of the cutting radius $r_1$. Thus, $d_2 + r_3 = r_1$.

The helical groove 7 intersects the helical ridges 6 so that a plurality of lands 8 are formed on each helical ridge 6, each land 8 extending between the first associated helical flute 5' and the second associated helical flute 5". The intersection of the helical groove 7 and the helical ridges 6 also results in the formation of a plurality of identical cutting teeth 11 on each helical ridge 6.

Each cutting tooth 11 is associated with and delimited by a pair of associated adjacent lands 8', 8" of the plurality of lands 8, namely a first associated land 8' and a second associated land 8". Each cutting tooth 11 is further delimited by the helical flutes 5', 5". The second associated land 8" is positioned at a larger axial distance from the front end 2 than the first associated land 8' and consequently also behind the first associated land 8' in the direction of rotation R.

Each cutting tooth 11 on the helical ridges 6 comprises a second ridge 10 formed in a transition between the first associated land 8' and the second associated land 8". Thus, a plurality of sharp second ridges 10 are formed on each helical ridge 6. The second ridges 10 may have a short extension along the helical groove 7, as in the shown embodiment. Furthermore, each cutting tooth 11 comprises a cutting edge 9 formed in a transition between the first associated land 8' and the first associated helical flute 5', and a clearance edge 16 formed in a transition between the second associated land 8" and the first associated helical flute 5'. The second ridge 10, the cutting edge 9 and the clearance edge 16 join in a tooth tip 12 constituting the radially outermost point of the cutting tooth 11 and being located at the cutting radius $r_1$ of the cutting tool 1.

Figure 5:
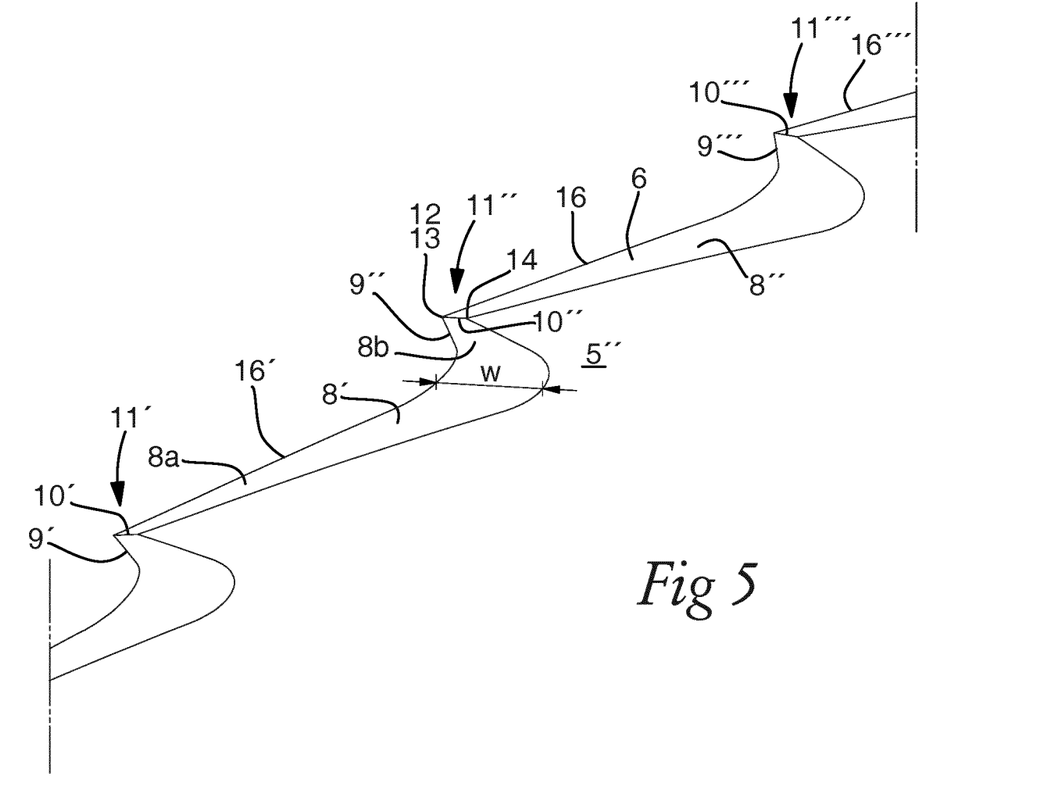
FIG. 5 is a detail view showing a portion of the cutting tool in FIG. 1.

Reference is made to FIG. 5, showing identical first, second and third cutting teeth 11', 11" and 11''' in larger detail, the first cutting tooth 11' being located closest to the front end 2 of the cutting tool 1. The second cutting tooth 11" is associated with and delimited by the pair of associated adjacent lands 8', 8". The first, second and third cutting teeth 11', 11" and 11''' are respectively associated with the second ridges 10', 10" and 10''', cutting edges 9', 9" and 9''', and clearance edges 16', 16" and 16'''.

The land 8' is delimited by the pair of adjacent second ridges 10', 10", of which the first associated second ridge 10' is positioned closer to the front end 2 than the second associated second ridge 10". The land 8' is in the form of a concavely curved surface as seen from a position on the land 8', with a flat or substantially flat foremost portion 8a and a bent rearmost portion 8b.

The land width w of the land 8' varies along a direction of extension of the helical ridge 6. Moving between from the first associated second ridge 10' towards the second associated second ridge 10", the land width w of the flat foremost portion 8a increases towards the rearmost portion 8b. The land width w thereafter decreases when moving along the bent rearmost portion 8b. For each land 8, a largest land width w of the land 8, as measured along a direction of extension of the helical groove 7, is less than 30%, preferably less than 20%, more preferably less than 15% and most preferably less than 10%, of a shortest distance w' between two of said lands 8', 8" situated on neighboring helical ridges 6', 6", as measured along the direction of extension of the helical groove 7.

The cutting edge 9" of the second cutting tooth 11" and the clearance edge 16' of the first cutting tooth 11' together form a curved line extending between the pair of associated second ridges 10', 10". During machining of a workpiece, the foremost portions 8a of the lands 8 as well as the clearance edges 16 form clearance surfaces, which are not in contact with the machined honeycomb structure. For cutting edges 9 located on the helical ridge 6, the first associated helical flute 5' constitutes a rake surface.

The cutting edge 9 of each cutting tooth 11, when seen in a plane perpendicular to the longitudinal axis, extends radially inwards from the tooth tip 12, at an angle γ with respect to a radial line extending between the longitudinal axis A and the tooth tip 12. In the shown embodiment, the angle γ is a small positive angle as shown in FIG. 8. The angle γ is measured at a first end of the cutting edge 9 adjacent to the tooth tip 12. If the cutting edge 9 at its first end has a direction of extension such that the cutting edge 9 extends in front of the radial line between the longitudinal axis A and the tooth tip 12, seen in the direction of rotation R, the angle γ has a negative value. If the cutting edge 9 at its first end has a direction of extension such that the cutting edge 9 extends behind the radial line between the longitudinal axis A and the tooth tip 12, seen in the direction of rotation R, the angle γ has a positive value. In FIG. 8, the angle γ has a positive value. The angle γ may be such that $-20° \leq \gamma \leq +30°$, more preferably $-5° \leq \gamma \leq +20°$, most preferably $\gamma = 0°$, when seen in a plane perpendicular to the longitudinal axis.

The clearance edge 16 of each cutting tooth 11 also extends inwards from the tooth tip 12, but at an angle φ with respect to a radial line extending between the longitudinal axis A and the tooth tip 12, as shown in FIG. 6. The angle φ is in the shown embodiment about 70. In general, and in independence of the other features of the cutting tool, the angle φ should be such that $50° \leq \varphi < 90°$. If the angle φ is 90° or more, the clearance edge 16 does not have a function of a clearance which results in unnecessary heat generation and lower tool life. If the angle φ is less than 50°, the thermal conductivity of the tooth is lower, and the heat generated in the cutting zone of the tooth is not conducted away from the tooth tip fast enough, which may result in reduced tool life.

Referring again to FIG. 5, each second ridge 10 (illustrated by the second ridge 10") has a first end 13 that coincides with the tooth tip 12 and a second end 14 situated behind the first end 13 in the direction of rotation R. A radial distance between the second end 14 of the second ridge 10 and the longitudinal axis A is smaller than or equal to a radial distance between the first end 13 of the second ridge 10 and the longitudinal axis A. In other words, the second end 14 is located closer to the longitudinal axis A than the first end 13. Thus, behind the cutting edge 9, the second ridge 10 is not in contact with the workpiece during machining.

As measured in the axial direction of the cutting tool 1, i.e. along the longitudinal axis A, a smallest axial distance y between two tooth tips of the cutting tool 1 is $0 < y \leq 0.3$ mm. This distance y is measured between a first tooth tip 12' located on a first one of said helical ridges 6 and a second tooth tip 12" located on a second one of said helical ridges 6 located directly behind the first helical ridge 6 in the direction of rotation R as shown in FIG. 3. The second tooth tip 12" is located closer to the front end 2 than the first tooth tip 12'. For a cutting tool 1 comprising a single helical groove 7, the smallest axial distance y between two tooth tips 12 can be approximated by a pitch of the helical groove 7 divided by the number of helical ridges 6. For a cutting tool 1 having eight helical ridges 6, a cutting radius $r_1$ of 8 mm, and a second helix angle β of 91°, the axial distance y is approximately 0.13 mm.

The cutting tool 1 in the shown embodiment further comprises two front cutting edges 15 formed at the front end 2 of the cutting tool 1. It is also possible to provide the cutting tool without front cutting edges if the tool is to be used merely for contouring or edge milling. Also, only a portion of the cutting tool may be provided with the at least one helical groove, i.e. the at least one helical groove may not necessarily extend over the same length along the longitudinal axis as the helical flutes. For example, the helical flutes may extend from front cutting edges of the cutting tool, while as the helical groove(s) extend(s) from a position closer to the rear end of the cutting tool.

In the shown embodiment, only one helical groove 7 is formed in the peripheral surface 4. However, more than one helical groove may be provided, as long as two adjacent lands 8 formed on one of the helical ridges 6 intersect to form the second ridge 10.

Figure 9:
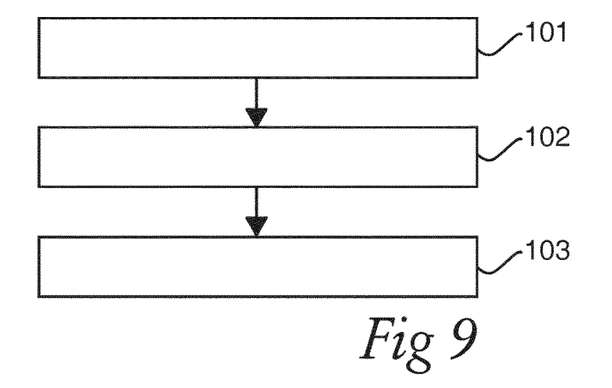
FIG. 9 is a flow chart illustrating a method of manufacturing a cutting tool according to an embodiment of the invention.

A method for manufacturing a cutting tool as described above according to an embodiment of the invention is illustrated in the flow chart in FIG. 9.

In a first step 101, a cylindrical tool blank with a circular base is provided. The tool blank may e.g. be a cemented carbide tool blank.

In a second step 102, the set of helical flutes 5 for chip evacuation are formed using a first grinding wheel having a first grinding surface and a second grinding surface, the second grinding surface preferably being formed at an angle $\theta_1$ of 35-55° with respect to the first grinding surface. The first grinding surface thus forms a first sidewall of the helical flutes 5 and the second grinding surface forms a second sidewall of the helical flutes 5. The grinding wheel may e.g. have a V-shaped or a rounded profile, depending on a desired bottom profile of the helical flutes 5.

In a third step 103, the helical groove 7 or grooves are formed using a second grinding wheel having a first grinding surface and a second grinding surface, the second grinding surface preferably being formed at an angle $\theta_2$ of 10-20° with respect to the first grinding surface. The second grinding wheel preferably has a rounded profile to create curved lands 8 on the helical ridges 6. The land width w of the lands 8 depends on the grinding depth used when creating the helical groove 7. The first grinding wheel and the second grinding wheel may be the same wheel, but preferably the second grinding wheel is different from the first grinding wheel.

The step 103 may be performed before or after the step 102. Grinding of the helical flutes 5 and the helical grooves 7 together create the helical ridges 6, the second ridges 10, the cutting edges 9 and the lands 8.

Figure 10:
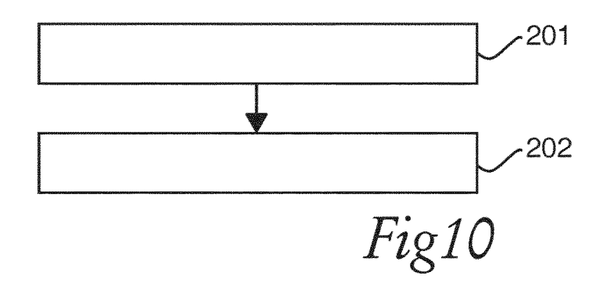
FIG. 10 is a flow chart illustrating a method for machining of a honeycomb structure according to an embodiment of the invention.

A method for machining of a workpiece comprising a honeycomb core according to an embodiment of the invention is illustrated in the flow chart in FIG. 10.

In a first step 201, a cutting tool 1 as described above is provided and fastened to a tool holder.

In a second step 202, the cutting tool 1 is simultaneously rotated in the direction of rotation R and moved with respect to the honeycomb workpiece in a feeding direction, such that at least some of the cutting edges 9 of the cutting tool 1 are brought into engagement with the honeycomb core. The multiple cutting edges 9 thereby remove material from the honeycomb core. In the second step 202 it is also possible to move the honeycomb workpiece toward the tool. It is also possible to move both the cutting tool and the honeycomb workpiece.

The embodiments herein are not limited to the above described embodiments. Various alternatives, modifications and equivalents may be used. Therefore, the above embodiments should not be taken as limiting the scope of the embodiments, which is defined by the appended claims.

The invention claimed is:

1. A rotatable cutting tool for machining of a workpiece having a honeycomb core, the cutting tool having a longitudinal axis around which the cutting tool is rotatable in a direction of rotation, the cutting tool comprising:
a front end;
a rear end opposite the front end, the cutting tool being arranged to be fastened to a tool holder or a machine spindle;
a peripheral surface extending around the longitudinal axis between the front end and the rear end;
a set of helical flutes arranged for chip evacuation formed in the peripheral surface, the helical flutes extending from the front end towards the rear end at a first helix angle $\alpha$ with respect to the longitudinal axis, wherein $45° \leq \alpha \leq 65°$, the helical flutes having a first depth;
a set of helical ridges, each helical ridge being associated with and formed between a pair of adjacent helical flutes comprising a first associated helical flute and a second associated helical flute, wherein the second associated helical flute is positioned behind the first associated helical flute in the direction of rotation; and
at least one helical groove formed in the peripheral surface, the at least one helical groove having a second depth which is smaller than the first depth, so that the at least one helical groove is interrupted by the helical flutes, wherein the at least one helical groove intersects the helical ridges so that a plurality of lands are formed on each helical ridge, each land extending between the first associated helical flute and the second associated helical flute, and wherein a plurality of cutting teeth are formed on each helical ridge, each cutting tooth being delimited at least by a pair of associated adjacent lands of said plurality of lands, said pair of associated adjacent lands comprising a first associated land and a second associated land, wherein the second associated land is positioned at a larger axial distance from the front end than the first associated land, wherein the at least one helical groove extends at a second helix angle $\beta$ with respect to the longitudinal axis, wherein $90° < \beta < 100°$, and wherein each cutting tooth of said plurality of cutting teeth comprises:
a second ridge, the second ridge being formed in a transition between the first associated land and the second associated land,
a cutting edge formed in a transition between the first associated land and the first associated helical flute, and
a clearance edge formed in a transition between the second associated land and the first associated helical flute, wherein the second ridge, the cutting edge and the clearance edge join in a tooth tip constituting the radially outermost point of the cutting tooth and being located at a cutting radius of the cutting tool.

2. The cutting tool according to claim 1, wherein the cutting edge of each cutting tooth of the plurality of teeth, when seen in a plane perpendicular to the longitudinal axis, extends radially inwards from the tooth tip at an angle $\gamma$ with respect to a radial line extending between the longitudinal axis and the tooth tip.

3. The cutting tool according to claim 2, wherein $-20° \leq \gamma \leq +30°$, when seen in a plane perpendicular to the longitudinal axis.

4. The cutting tool according to claim 1, wherein each second ridge has a first end that coincides with the tooth tip and a second end situated behind the first end in the direction of rotation.

5. The cutting tool according to claim 4, wherein a radial distance between the second end of each second ridge and the longitudinal axis is smaller than or equal to a radial distance between the first end of each second ridge and the longitudinal axis.

6. The cutting tool according to claim 1, wherein a largest land width of each of said plurality of lands, as measured along a direction of extension of the at least one helical groove, is less than 30% of a shortest distance between two of said lands situated on two neighboring helical ridges, as measured along a direction of extension of the at least one helical groove.

7. The cutting tool according to claim 1, wherein each land of said plurality of lands, as measured along a direction of extension of the at least one helical groove, has a land width that varies along a direction of extension of the helical ridge on which the land is located.

8. The cutting tool according to claim 7, wherein, between each pair of adjacent second ridges located on the same helical ridge, said pair of adjacent second ridges comprising a first associated second ridge and a second associated second ridge, the first associated second ridge being positioned closer to the front end than the second associated second ridge, the land width increases from the first associated second ridge towards the second associated second ridge.

9. The cutting tool according to claim 1, wherein the first depth is such that a shortest radial distance between a surface of each of said helical flutes and the longitudinal axis is 55-70% of the cutting radius.

10. The cutting tool according to claim 1, wherein the second depth is such that a shortest radial distance between a surface of each land of said plurality of lands and the longitudinal axis is 85-99.9% of the cutting radius ($r_1$).

11. The cutting tool according to claim 1, wherein each land of said plurality of lands is in the form of a curved surface.

12. The cutting tool according to claim 1, wherein, as measured in the axial direction of the cutting tool, a smallest axial distance (y) between two tooth tips of the cutting tool is $0 < y \leq 0.3$ mm.

13. The cutting tool according to claim 12, wherein said smallest axial distance is measured between a first tooth tip located on a first one of said helical ridges and a second tooth tip located on a second one of said helical ridges located directly behind the first helical ridge in the direction of rotation, wherein the second tooth tip is located closer to the front end than the first tooth tip.

14. A method for manufacturing a cutting tool according to claim 1, the method comprising:
providing a cylindrical tool blank with a circular base;
forming the set of helical flutes using a first grinding wheel having a first grinding surface and a second grinding surface, the second grinding surface being formed at an angle $\theta_1$ of 35-55° with respect to the first grinding surface; and
forming the at least one helical groove using a second grinding wheel having a first grinding surface and a second grinding surface, the second grinding surface preferably being formed at an angle $\theta_2$ of 10-20° with respect to the first grinding surface.

15. A method for machining of a workpiece having a honeycomb core, the method comprising:
   providing a cutting tool according to claim 1; and
   simultaneously rotating the cutting tool in the direction of rotation and moving the cutting tool with respect to the workpiece in a feeding direction, or moving the workpiece with respect to the cutting tool, such that at least some of the cutting edges of the cutting teeth are brought into engagement with the honeycomb core.

* * * * *